Patented May 30, 1939

2,160,532

UNITED STATES PATENT OFFICE 2,160,532

ESTERS

Harold J. Barrett, Niagara Falls, N. Y., and Daniel E. Strain, Wilmington, Del., assignors to E. I. du Pont de Nemours & Company, Wilmington, Del., a corporation of Delaware No Drawing. Application September 2, 1936, Serial No. 99,131

14 Claims. (Cl. 260—83)

This invention relates to new compositions of matter and more particularly to mixed esters of polyhydric alcohols with a plurality of monocarboxylic acids and to methods of preparing and using the same. Still more particularly the invention relates to polyhydric alcohols esterified with an alpha-methylene monocarboxylic acid and one or more different monocarboxylic acids, and to the use of these mixed esters in coating compositions.

This invention has as its object the preparation of new and useful compositions of matter. A further object is the preparation of a new class of drying oils or polymerizable substances comprising polyhydric alcohols esterified partly with fatty oil acids and partly with acids of the acrylic series. A still further object is to provide new and useful coating and molding compositions.

These and other objects appearing hereinafter are accomplished by the following invention wherein a polyhydric alcohol is esterified by a plurality of monocarboxylic acids, one of which is an alpha-methylene monocarboxylic acid. One method of carrying out this esterification is to react the alpha-methylene monocarboxylic acid (or an ester-forming derivative thereof such as an acid halide, the acid anhydride, or an ester of the acid with a volatile alcohol) with a polyhydric alcohol which is already partially esterified with a different monocarboxylic acid, for example, a long chain fatty acid.

It will be seen that the expression "alpha-methylene monocarboxylic acid" is a class name for acrylic acid and its homologs, the latter being acids in which the alpha hydrogen atom of acrylic acid is replaced by a substituent radical. The alpha-methylene monocarboxylic acids of particular use in the present invention have the general formula $CH_2=C(R)-COOH$, where $R$ is hydrogen or a hydrocarbon radical, such as an alkyl, aryl, aralkyl, or cycloalkyl radical.

According to a preferred embodiment of this invention, a polyhydric alcohol partially esterified with a fatty oil acid or acids such as soya bean oil acids, is prepared, and the remaining alcoholic hydroxyl group or groups are then esterified wtih an alpha-methylene monocarboxylic acid such as methacrylic acid, preferably in the presence of a substance such as hydroquinone which prevents polymerization of the product during the reaction. The reaction mixture is then diluted with a solvent such as ether and washed thoroughly with dilute caustic alkali solution in order to remove completely the polymerization inhibitor which would otherwise interfere with subsequent use of the product by preventing or retarding "drying" or polymerization to a hard film or molded article. The mixture is then washed with water until free of alkali, and dried. It is often necessary to treat the solution wtih a decolorizing or clarifying agent such as bone black in order to remove turbidity and improve its color. After the solution has been dried, the volatile solvent such as ether is distilled off in vacuo at a temperature below 55° C. to prevent polymerization, leaving the product, which may be an oily liquid or a solid, depending upon its chemical composition.

The esterification of the polyhydric alcohol may be effected in any suitable manner. For example, the alcohol may be incompletely esterified with the desired amount of fatty oil acids, leaving free alcoholic hydroxyl groups which may then be esterified with an acid such as methacrylic acid. Alternatively, the alcohol may first be incompletely esterified with the acrylic acid and then further esterified with the fatty oil acids. Such methods of esterification are well known to those skilled in the art. For example, the alcohol and the free acids may be heated in the presence of an acid esterification catalyst such as dry hydrogen chloride, sulfuric acid or paratoluolsulfonic acid until the desired degree of esterification has been obtained. Alternatively, the anhydrides, mixed anhydrides, or acid chlorides of the acids may be used with the free alcohol to effect esterification. Still another method of preparing the esters is to react the sodium salts of the acids with the alkyl halides corresponding to the alcohol. It may at times be convenient to react the alcohol and the acids without the use of a catalyst by heating them together in the desired proportions at temperatures above 150° C. while passing a slow stream of inert gas through the mixture to carry off the water which forms. All of these methods are well known to those skilled in the art and need no amplification here. It will of course be necessary in most cases to carry out some preliminary experimentation to determine the most favorable conditions for any particular reaction.

Glycerol mono- and di-esters are perhaps most conveniently prepared from the naturally occuring glycerides particularly the fats and oils. In this field a terminology has grown up whereby an ester of glycerol having two hydroxyls free and the third esterified by the fatty acids is called a monoglyceride of the fatty oil, and a glyceride having one hydroxyl free and two esterified by the fatty acids is called a di-glyceride of the fat or fatty oil.

Glycerol esters such as those described herein can best be produced by first preparing a fatty oil mono- or di-glyceride by reacting the fatty oil, preferably in the presence of an alcoholysis catalyst such as litharge, with glycerol as illustrated in the following equations:

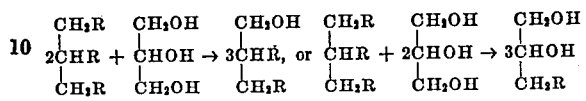

(where R is the fatty acid radical or radicals), and then esterifying the free alcoholic hydroxyl groups of the mono- or diglyceride with the alpha-methylene monocarboxylic acid.

Having thus outlined the principles and purposes of the invention, the following exemplifications thereof, wherein parts are by weight, are added in illustration and not in limitation.

EXAMPLE I

*Preparation of soya bean oil diglyceride methacrylate*

A mixture of 872 parts of raw soya bean oil (1 mol), 48.5 parts of water white glycerol (0.5 mol), and 2.18 parts of litharge was placed in a reaction vessel fitted with a reflux condenser, thermometer, stirrer, and blowing tube. The mixture was blown gently with nitrogen, stirred very rapidly and heated for two hours at 200° C. The contents of the vessel were cooled somewhat and 32 parts of activated charcoal was added. The product was filtered by suction, the material in the filter being kept warm with a steam coil during the filtration. The filtrate, when cooled, was a dark brown liquid. The yield was 835 parts or 90.8 per cent of the theoretical. The saponification number of the product was 197.5 as compared with the theoretical saponification number of 184.

A mixture of 613 parts of soya bean oil diglyceride (1 mol) as prepared above, 400 parts of methyl methacrylate monomer (4 mols), 260 parts of benzene, and 24 parts of hydroquinone was placed in a reaction vessel fitted to a fractionating column by means of a modified Y arrangement so that the catalyst solution, which is made by dissolving 4.9 parts of sodium in 50 parts of methanol, could be dropped from a separatory funnel directly upon the surface of the reaction mixture. The flask and its contents were heated in an oil bath at 130°–140° C. until all of the water had been removed from the charge as a binary with benzene (B. P. 70° C.). When the temperature at the head of the column had reached 80° C. (the boiling point of benzene), catalyst solution was added at intervals in small portions during the remaining heating operation, which lasted 34.5 hours. The temperature dropped to about 58° C. during this operation, due to the distillation of a methanol-benzene binary (B. P. 58° C.) which necessarily resulted from addition of methanol as well as from liberation of methanol in the ester interchange. During this heating operation a total of 23 parts of catalyst solution was added. The distillate, collected at the head of the column, was removed from time to time during the heating operation and shaken with five times its volume of water to determine the amount of methanol present in it. From this amount of methanol was subtracted the methanol added in the form of catalyst solution up to the time of the reading, and the resulting figure considered as methanol liberated by the ester interchange. When liberation of methanol had ceased, the flask and its contents were cooled, diluted with 360 parts of ether, washed once with 500 parts of water, filtered and then washed twice with 275 part portions of 10 per cent sodium hydroxide solution. The organic layer was then washed 8 times with 500 part portions of water or until the wash water was perfectly free from color. It is necessary to remove hydroquinone substantially completely in order that the final product shall polymerize or set up to a hard film. The emulsions which were formed during washing were broken by means of salt and ether. The upper layer, after the final washing with water, was removed and dried with 100 parts of anhydrous magnesium sulfate. The dry solution was filtered with suction, and the filtrate heated at 45°–50° C. in vacuo for about 5 hours to remove the low boiling constituents such as ether, benzene, and excess methyl methacrylate monomer. A slow current of air or carbon dioxide was passed through the product in the same manner as would be done during a vacuum distillation. The oily product remaining after evaporation of the low boiling constituents was mixed with 10 parts of "Filter Cel" and filtered with suction. The final product was a clear, dark brown oil of pleasant odor, different from the original soya bean oil diglyceride. The yield was 604 parts or 88.6 per cent of the theoretical. The saponification number of the product was 246 (theoretical 249).

A 33 per cent solution in toluene of this product containing 0.015 per cent of cobalt (based upon the weight of product) as a cobalt drier solution dried to a non-tacky, clear, slightly yellow, fairly hard, flexible film when heated at 100° C. for 3 hours.

A solution of 30 parts of the product and 0.3 part of benzoyl peroxide in 30 parts of methanol heated at 100° C. for three days set to a rubbery gel which did not crumble readily. This polymer was insoluble in water and in organic solvents.

EXAMPLE II

*Preparation of soya bean oil monoglyceride dimethacrylate using methyl methacrylate*

A mixture of 176 parts (0.5 mol) of soya bean oil monoglyceride, 400 parts (4 mols) of methyl methacrylate monomer, 24 parts of hydroquinone, and 260 parts of benzene in a reaction vessel equipped as described in Example I, was heated in an oil bath at about 150° C. and was otherwise treated as described in Example I, 36 parts of the sodium methylate solution being added and the mixture being heated for a total of 48 hours. After the reaction product, obtained essentially as described in Example I, had been dried with anhydrous magnesium sulfate and the low boiling constituents removed in vacuo, it was heated for 15 minutes on a steam bath with 4 parts of bone black and filtered. Two hundred and twenty parts (90.2 per cent of the theoretical yield) of a light yellow polymerizable oil were obtained, the viscosity of which was 0.25 poise at 25° C. The saponification number of this oil was 320.8 (theoretical 349.0).

EXAMPLE III

*Preparation of coconut oil diglyceride methacrylate*

A mixture of 469 parts (1 mol) of coconut oil diglyceride, 400 parts (4 mols) of methyl methacrylate monomer, 24 parts of hydroquinone, and 260 parts of benzene was treated as described in Example I with 18 parts of a solution of 4.9 parts of metallic sodium dissolved in 50 parts of methyl alcohol. The mixture was heated as in Example I (the temperature of the oil bath being 128°–137° C.) for a total of 35 hours. After washing the reaction mixture, drying it with anhydrous magnesium sulfate, filtering it and distilling off unchanged methyl methacrylate monomer, benzene, etc., in vacuo, the jelly-like residue was shaken with acetone, the slurry centrifuged, and the clear solution agitated with 12 parts of bone black and filtered. After removal of the acetone in vacuo at about 30 mm. pressure and at 45°–50° C., 275 parts (51.2 per cent of the theoretical yield) of a clear yellow oily liquid were obtained, the saponification number of which was 305 (theoretical 315). The oil was soluble in ether, toluene, methanol, and acetone. Films insoluble in and not attacked by water and organic solvents may be prepared by flowing upon a suitable surface a 20% solution of the oil in toluene containing 2% benzoyl peroxide based on the oil, and subsequently baking for 4 hours at 100° C. Similar results are obtained by baking for one hour at 100° C. films laid down from a 50% solution in methanol containing 1% benzoyl peroxide based on the oil.

EXAMPLE IV

*Preparation of China-wood oil diglyceride methacrylate*

A mixture of 613 parts (1 mol) of China-wood oil diglyceride, 400 parts (4 mols) of methyl methacrylate monomer, 24 parts of hydroquinone, 260 parts of dry benzene, 104 parts of dioxane and 40 parts of methanol was treated with 18 parts of a solution of 4.9 parts of metallic sodium in 50 parts of methanol, all of the catalyst being added at the beginning of the reaction instead of intermittently as in the preceding examples. The dioxane and methanol were added to prevent foaming of the reaction mixture. The mixture was heated in an oil bath at 120°–150° C. for a total of 45 hours as described in Example I. After being cooled and filtered, the mixture was diluted with about three times its volume of ether, washed with water, then with 10 per cent sodium hydroxide solution until free of hydroquinone, and finally with water containing sodium chloride. The solution was dried over anhydrous magnesium sulfate, filtered, and the ether and other low boiling constituents were evaporated off in vacuo. The residue was a dark brown, viscous oil which had a saponification number of 208.8 (theoretical 247), and which polymerized on heating in the presence of benzoyl peroxide or cobalt driers.

The invention may be further illustrated by the following examples in which mixed glycerides of fatty oil acids and methacrylic acid are prepared by methods other than the "ester interchange" method illustrated in the preceding examples.

EXAMPLE V

*Preparation of soya bean oil monoglyceride dimethacrylate using metacrylyl chlorides*

A mixture of 176 parts (0.5 mol) of soya bean oil monoglyceride and 130.5 parts (1.25 mol) of methacrylyl chloride was placed in a reaction vessel fitted with a thermometer and a reflux condenser closed at the top with a calcium chloride tube. The mixture was heated on a water bath for one hour at 83°–97° C. After the evolution of hydrogen chloride had ceased, the mixture was heated 20 minutes longer, cooled, diluted with 215 parts of ether, washed three times with 215 part portions of 5 per cent sodium hydroxide solution, then with water and finally agitated for two hours with 15 parts calcium hydroxide to remove the last traces of unchanged methacrylyl chloride. The mixture was then filtered, dried over anhydrous calcium chloride, again filtered and the ether evaporated off in vacuo at room temperature. The product was a slightly viscous, yellow oil. An 87.7 per cent yield was obtained.

A film flowed from a 17 per cent solution in toluene of the oily product containing 0.015 per cent of cobalt as cobalt linoleate became flexible and non-tacky on heating at 95° C. for 72 hours.

EXAMPLE VI

*Preparation of soya bean oil monoglyceride monomethacrylate*

One hundred seven (107) parts of methacrylic acid was placed in a reaction vessel fitted with a thermometer, reflux condenser, stirrer and dropping funnel. One hundred ninety-nine (199) parts of benzoyl chloride was added with vigorous stirring. (Benzoyl chloride presumably reacts with methacrylic acid to form a mixed anhydride, which in turn reacts with an alcoholic hydroxyl group to form a methacrylate with liberation of benzoic acid.) One hundred sixty-nine (169) parts of pyridine was then added dropwise while stirring was continued. One hundred seventy-four (174) parts of soya bean oil monoglyceride was added and the mixture heated at 70°–102° C. for 4 hours. It was then cooled, diluted with 360 parts of ether, washed three times with 500 part portions of 10 per cent aqueous sodium hydroxide solution, then with 10 per cent aqueous hydrochloric acid, and finally with water. The mixture was next dried over anhydrous magnesium sulfate and filtered after which it was treated with 10 parts of bone black, again filtered and heated in vacuo at 80° C. to distill off the ether and any residual pyridine. A 69.7 per cent yield of a brown, slightly viscous oil of pleasant ester-like odor was obtained. The saponification number of this oil was 276.8 (theoretical for soya bean oil monoglyceride dimethacrylate 349; for monomethacrylate 271). Hence, the product was largely soya bean oil monoglyceride monomethacrylate.

A film flowed from a 17 per cent solution in toluene of the oily product containing 0.015 per cent of cobalt as cobalt linoleate dried to a slightly tacky, clear film in one half hour when baked at 100° C. The film becomes non-tacky when heating is continued for longer periods of time.

One part of the oily product containing 0.015 per cent cobalt as cobalt linoleate polymerized to a non-bubbly solid in two hours when heated at 100° C. Similar results were obtained when 1 per cent of benzoyl peroxide was substituted for the cobalt drier. Soya bean oil monoglyceride itself does not polymerize under such conditions in 48 hours.

EXAMPLE VII

*Preparation of glycol laurate methacrylate*

A mixture of 249 parts (1 mol) of glycol monolaurate, 400 parts (4 mols) of methyl methacrylate monomer, 24 grams of hydroquinone, and 260 parts of dry benzene was treated, in an apparatus similar to that described in Example I, with 18 parts of a solution of 4.9 grams of metallic sodium in 50 parts of methanol, and was heated at 128°–144° C. as in Example I for a total of 32 hours. The mixture was cooled, diluted with 360 parts of ether, and washed with successive portions of 10 per cent sodium hydroxide solution to remove the inhibitor. It was then washed with water until free of alkali. A little salt was added to the wash water in order to break the emulsions which formed during this operation. The ether solution was dried over anhydrous magnesium sulfate, filtered, and the ether distilled off in vacuo from a water bath. A 91.5 per cent yield of a clear brown, oily liquid having an ester-like odor was obtained (saponification number 335.8, theoretical 354). The liquid polymerized readily upon heating in the presence of benzoyl peroxide.

In Examples I–VI inclusive the glyceride methacrylates are prepared from fatty oil mono- or di-glycerides in which the glycerol is partly esterified with the mixed acids of the fatty oils. If desired, however, the process may be applied to the preparation of mono- or di-glyceride methacrylates in which one or two of the glycerol hydroxyl groups are esterified with any desired monocarboxylic acid, particularly any one of the acids which may be obtained by hydrolysis of fatty oils. Esters such as glycerol dieleostearate monomethacrylate, glycerol eleostearate dimethacrylate, glycerol dilinoleate monomethacrylate, and glycerol dilinolenate monomethacrylate may, for example, be prepared by the process described in the aforementioned examples. The mono- or diglyceride of the desired acid may first be prepared by heating a mixture of one mole of glycerol and three moles of acid at about 150°–200° C., preferably in the presence of an esterification catalyst such as para-toluolsulfonic acid, until reaction is substantially complete (thus forming the triglyceride of the desired acid), then adding one or two moles of glycerine (depending on whether the di- or mono-glyceride is desired) and about 0.1–0.2% by weight of litharge (based upon the weight of the reaction mixture), and heating at about 150°–200° C. for two or three hours. The reaction mixtures should be protected from oxidation by blanketing them with carbon dioxide or nitrogen during the heating. The subsequent treatment of the mono- or di-glycerides is the same as described in the examples for the mixed fatty oil acids glycerides. The resulting glyceride methacrylates contain only two acid radicals, viz., those of methacrylic acid and of the acid the mono- or diglyceride of which was used in the preparative procedure. Such glyceride methacrylates are polymerizable oils and can be converted to dry, hard, insoluble films or molded products by heating them, as described in the examples, in the presence of catalytic proportions of benzoyl peroxide or cobalt driers.

As already indicated, the products of this invention polymerize or "dry" in the presence of either benzoyl peroxide or cobalt driers. It is believed that the products set up to solid films or solid polymers due to the presence of the methacrylic acid residues in the ester molecules, since the fatty oil acids mono- and di-glycerides alone do not set up to solid films. That the "drying" properties of these mixed glycerides of fatty oil acids and methacrylic acid are due to the influence of the methacrylic acid residues is further indicated by the fact that even the mixed esters containing non-drying or semi-drying oil acid residues polymerize or dry in the presence of catalytic proportions of benzoyl peroxide or cobalt drier, whereas the mono- or di-glycerides of such non-drying or semi-drying oil acids would not set up the solid films under such conditions.

The value of the esters described herein for coating compositions, etc., is greatly enhanced when they are interpolymerized or "dried" with each other or with other polymerizable materials, or when they are polymerized in the presence of resins, cellulose derivatives, or other film-forming materials. Under such conditions the films of the polymerized or dried esters are harder, tougher, more adherent, and generally more useful than are films of the polymerized esters alone. The following examples illustrate these embodiments of the invention.

EXAMPLE VIII

*Interpolymerization of different glycerol-methacrylic acid-fatty acid mixed esters*

An approximately 50 per cent solution in toluene was prepared of a mixture of 25 per cent soya bean oil monoglyceride dimethacrylate, 75 per cent soya bean oil diglyceride mono-methacrylate, and 0.03 per cent metallic cobalt as cobalt linoleate (based upon the weight of the combined glycerides). Films of this solution applied over steel and glass formed clear, fairly hard, tough, flexible films when heated at 100° C. for 10 hours.

EXAMPLE IX

*Interpolymerization of mixed methacrylic acid-fatty acid esters of different polyhydric alcohols*

A film flowed from a toluol solution of a mixture composed of 75 per cent soya bean oil monoglyceride dimethacrylate and 25 per cent of glycol monolaurate monomethacrylate and containing 0.03 per cent cobalt (as cobalt linoleate) based upon the weight of the polymerizable mixture, became clear, hard, non-tacky, and strongly adherent to the underlying surface after being heated for several hours at 100° C. The film was superior in strength, hardness, and adhesion to corresponding films from either ester alone.

EXAMPLE X

*Polymerization of methacrylic acid-fatty acid-polyhydric alcohol esters in the presence of film-forming materials*

To a solution of 0.53 part by volume of soya bean oil diglyceride monomethacrylate monomer and 0.53 part by volume of isobutyl methacrylate polymer in 2.3 parts by volume of toluol was added enough cobalt linoleate drier solution to give 0.03 per cent metallic cobalt based on the weight of soya bean oil diglyceride monomethacrylate. When a film of the resulting solution over glass was baked at 100° C. for 10 hours, it was found to be hard and homogeneous.

If desired, other resins can be substituted for the isobutyl methacrylate polymer used in Example X. Cellulose derivatives such as cellulose esters and ethers may also be used.

Only the monomeric products of this invention are soluble in the usual solvents. When the monomeric products are polymerized, they become substantially insoluble and infusible. It is therefore generally necessary to polymerize the monomers in situ to obtain useful products, i. e., they should, when used as coating compositions, be applied to the underlying base material in the monomeric condition, and then polymerized in place.

The monomeric polyhydric alcohols in general can be used in this invention. By a polyhydric alcohol is meant a compound containing two or more free alcoholic hydroxyl groups. The invention thus includes in its scope trimethylene glycol, propane-1,2-diol, butylene glycols, amylene glycols, hexylene glycols, tetramethyl-ethylene glycol, glycerol monochlorhydrin, erythritol, arabitol, mannitol, sorbitol, the monobutyl and monobenzyl ethers of glycerol; and the mono- and diethyl ethers of sorbitol.

In the examples are disclosed the use of such acids as China-wood oil acids, soya bean oil acids, and coconut oil acids, as well as single monocarboxylic acids such as lauric and eleostearic. Any other monocarboxylic acid can be used, either alone or in admixture with other like acids, such as the mixed acids obtained from fatty oils. Acids containing at least 16 carbon atoms are preferably employed. The acids may be either saturated or unsaturated, e. g., acetic, butyric, lauric, stearic, oleic, iso-valeric, crotonic, benzoic, abietic, cinnamic, or mixtures thereof. The fatty acid mixtures prepared by saponification of drying and semi-drying oils are particularly useful, e. g., linolic, linoleic, linolenic, eleostearic, ricinoleic, etc.

In the examples, methacrylic acid or its derivatives have been used for esterification of the fatty oil acids mono- or di-glycerides. Any other alpha-methylene monocarboxylic acid can be used in place of methacrylic acid, e. g., alpha-ethyl acrylic acid, alpha-propyl acrylic acid, alpha-heptyl acrylic acid, alpha-cyclohexyl acrylic acid, and alpha-phenyl acrylic acid.

In general, it is possible to prepare by the methods given herein esters of polyhydric alcohols in which one or more but not all of the alcohol groups are esterified by an alpha-methylene monocarboxylic acid, and in which the remaining hydroxyl groups are esterified by any other monocarboxylic acid or acids. If more than one hydroxyl groups remain they may be esterified by different monocarboxylic acids, a specific example of such a product being the mixed glyceride of methacrylic acid, abietic acid, and eleostearic acid (from China-wood oil).

Sodium methylate is disclosed above as the catalyst for the "ester interchange" method of preparing the mixed glycerides of this invention. Alkali metal alcoholates in general can be used, such as potassium or other alkali metal methylates, or the corresponding ethylates. Esterification catalysts also can be used, e. g., sulfuric acid, dry hydrogen chloride, or other strong mineral acids, or benzenesulfonic acid. The proportions of alcoholysis or esterification catalyst can be varied over rather wide limits, as shown in the examples.

Hydroquinone is disclosed above as the polymerization inhibitor but other known polymerization inhibitors for methacrylic acid and its derivatives can be used in place of hydroquinone. In general, antioxidants are polymerization inhibitors for the products of this invention. Examples of other polymerization inhibitors are phenols, including catachol, hydroxyhydroquinone, pyrogallol, gallic acid, creosole, and aromatic amines such as diphenylamine, phenyl alpha-naphthylamine, phenylenediamines, etc.

Any solvent which is miscible with but does not react with the other ingredients of the reaction mixture may be used in place of the solvents disclosed in the examples. Benzene, toluene, xylene, mesitylene, and other aromatic hydrocarbons, especially those boiling below about 200° C.; ethers such as butyl and amyl ethers, and dioxane; ketones such as diethylketone, dipropyl ketone, di-iso-propyl ketone, ethyl propyl ketone and acetophenone, may be mentioned as suitable solvents. Mixtures of solvents can be used without departing from the spirit and scope of this invention. Reaction temperatures can be varied widely as occasion or convenience may demand, without departing from the fundamental principles underlying the invention.

Benzoyl peroxide and cobalt linoleate are the preferred polymerization catalysts. We generally prefer to use cobalt linoleate or other soluble organic cobalt salts, instead of benzoyl peroxide, since, as shown in the examples, cobalt driers are superior to benzoyl peroxide in effecting the drying or polymerization of the products of this invention. However, inorganic peroxides such as hydrogen peroxide, and other organic peroxides besides benzoyl peroxide, may at times be used as polymerization catalysts, as may also other known driers such as manganese oleate, or cobalt-manganese, lead-manganese, or other well-known "driers" used in the paint and varnish arts.

As illustrated in the examples, mixtures of two or more of the products of this invention may be interpolymerized or "dried" to advantage. For example, a monomeric ester which gives a soft sticky polymer may be mixed with a monomeric ester which gives a hard, brittle one and polymerized to produce a dry film or solid polymer with properties intermediate but superior to those of the separate ingredients, with the result that the film is superior in utility to corresponding films of either ingredient alone. Likewise the monomers may be polymerized in the presence of resins (synthetic or natural), cellulose derivatives, and other film-forming materials.

The monomeric products of this invention may be used as partial or total substitutes for drying oils in the formulation of paints, varnishes and lacquers. They are particularly useful because of their drying and heat-hardening properties as ingredients of dipping primers, enamels, etc., which, when they contain our esters will set up to hard, substantially insoluble films by baking at elevated temperatures. The products of this invention are also useful as modifying agents, softeners, etc., for cellulose derivatives such as nitrocellulose, cellulose acetate, ethyl cellulose, and benzyl cellulose. They are furthermore useful in admixture with natural or synthetic resins of all kinds, particularly with oil-modified polybasic acid-polyhydric alcohol resins, and with monomeric or polymerized esters, nitriles, amides, etc., of acids of the acrylic series (for example, with methyl methacrylate, isobutyl methacrylate or cyclohexyl methacrylate), for the formulation of coating and molding compositions.

To the products of this invention, or to mixtures thereof with each other or with other polymerizable substances, or with resins, cellulose derivatives, etc., may be added pigments, waxes, dyes, etc., as needed and desired.

This invention affords a means of converting non-drying or semi-drying oils into oils which will dry in the air to useful films or solid masses, especially in admixture with each other or with other substances which polymerize or dry to solids when heated in the presence of known driers or polymerization catalysts. Non-drying and semi-drying oils can thus be converted into drying oils. This is a highly surprising and unexpected result. Furthermore, drying oils can be converted into modifications thereof which dry faster and are more compatible with certain resins than are the original oils.

The above description and examples are intended to be illustrative only. Any modification of or variation therefrom which conforms to the spirit of the invention is intended to be included within the scope of the claims.

We claim:

1. A glycerol mixed ester of a plurality of monocarboxylic acids, one of which is methacrylic acid and the remainder of which comprise soya bean oil acids.

2. A monomeric polyhydric alcohol mixed ester of a plurality of monocarboxylic acids, one of which is methacrylic acid and the remainder of which comprise soya bean oil acids.

3. A glycerol mixed ester of a plurality of monocarboxylic acids, one of which is methacrylic acid and the remainder of which comprise drying oil acids.

4. A monomeric polyhydric alcohol mixed ester of a plurality of monocarboxylic acids, one of which is methacrylic acid and the remainder of which comprise drying oil acids.

5. A glycerol mixed ester of a plurality of monocarboxylic acids, one of which is methacrylic acid and the remainder of which comprise fatty oil acids.

6. A monomeric polyhydric alcohol mixed ester of a plurality of monocarboxylic acids, one of which is methacrylic acid and the remainder of which comprise fatty oil acids.

7. A glycerol mixed ester of a plurality of monocarboxylic acids, one of which is methacrylic acid and the remainder of which comprise a monocarboxylic acid of at least sixteen carbon atoms.

8. A monomeric polyhydric alcohol mixed ester of a plurality of monocarboxylic acids, one of which is methacrylic acid and the remainder of which comprise a monocarboxylic acid of at least sixteen carbon atoms.

9. A glycerol mixed ester of acids consisting of monocarboxylic acids, one of which is monomeric methacrylic acid.

10. A polyhydric alcohol mixed ester of acids consisting of monocarboxylic acids, one of which is monomeric methacrylic acid.

11. A polyhydric alcohol mixed ester of acids consisting of monocarboxylic acids, one of which is a monomeric alpha-methylene monocarboxylic acid.

12. A polymer of the product of claim 11.

13. A coating composition comprising the polyhydric alcohol mixed ester set forth in claim 11.

14. A coating composition comprising polymerized polyhydric alcohol mixed ester set forth in claim 11.

HAROLD J. BARRETT.
DANIEL E. STRAIN.